United States Patent
Flammer et al.

(10) Patent No.: US 7,197,946 B2
(45) Date of Patent: Apr. 3, 2007

(54) TORQUE MEASURING DEVICE FOR ELECTRIC MOTORS AND METHOD TO MEASURE THE TORQUE OF AN ELECTRIC MOTOR

(75) Inventors: Hermann Flammer, Zimmern-Floezlingen (DE); Hubert Hauser, Balgheim (DE); Norbert Irmer, Villingen-Schwenningen (DE); Guido Schmid, Triberg (DE)

(73) Assignee: Minebea Co., Ltd., Miyota-machi (JP)

( * ) Notice: Subject to any disclaimer, the term of this patent is extended or adjusted under 35 U.S.C. 154(b) by 170 days.

(21) Appl. No.: 10/891,703

(22) Filed: Jul. 14, 2004

(65) Prior Publication Data

US 2005/0011289 A1 Jan. 20, 2005

(30) Foreign Application Priority Data

Jul. 16, 2003 (DE) ................ 103 33 396

(51) Int. Cl.
 *G01L 3/02* (2006.01)
(52) U.S. Cl. ................. 73/862.331
(58) Field of Classification Search ............ 73/862.331
See application file for complete search history.

(56) References Cited

U.S. PATENT DOCUMENTS

| 4,937,483 | A  | * | 6/1990 | Matsui et al. ............... 310/105 |
| 6,176,355 | B1 | * | 1/2001 | Yamamoto ................... 188/267 |
| 6,443,020 | B1 | * | 9/2002 | Lin et al. ............... 73/862.334 |
| 6,478,126 | B2 | * | 11/2002 | Drecq .................... 188/264 D |

FOREIGN PATENT DOCUMENTS

| DE | 39 41 495 | 6/1990 |
| DE | 40 14 165 | 11/1991 |
| DE | 42 16 234 | 11/1993 |
| DE | 697 06 746 | 10/1997 |

* cited by examiner

*Primary Examiner*—Max Noori
(74) *Attorney, Agent, or Firm*—Lipsitz & McAllister, LLC

(57) ABSTRACT

A torque measuring device for electric motors having a rotor and a stator is proposed, said apparatus comprising a holding apparatus to hold the stator non-rotatably, an eddy current brake device which can be used to brake the rotor and a torque sensor connected to the eddy current brake device.

23 Claims, 1 Drawing Sheet

TORQUE MEASURING DEVICE FOR ELECTRIC MOTORS AND METHOD TO MEASURE THE TORQUE OF AN ELECTRIC MOTOR

The present disclosure relates to the subject matter disclosed in German application No. 103 33 396.7 of Jul. 16, 2003, which is incorporated herein by reference in its entirety and for all purposes.

BACKGROUND OF THE INVENTION

The invention relates to a torque measuring device for electric motors having a rotor and a stator.

Furthermore, the invention relates to a method to measure the torque of an electric motor having a stator and a rotor.

Torque as a function of rotational speed is an important parameter of an electric motor.

SUMMARY OF THE INVENTION

In accordance with the invention, a measuring device and a measuring method are provided which allow torque to be measured as a function of rotational speed in a simple and precise manner.

In accordance with the invention a holding apparatus is provided to hold the stator non-rotatably, an eddy current brake device which can be used to brake the rotor is provided and a torque sensor connected to the eddy current brake device is provided.

By means of such a measuring device, the torque of the electric motor can be determined as a function of the rotational speed of the rotor in a simple and precise manner. The rotor is set in rotation by the motor in operation. The rotor is braked by means of the eddy current brake device. As a result of this, a counterforce is in turn exerted on the eddy current brake device which can be measured as torque by the torque sensor. The measured torque provides a measurement for the torque of the electric motor.

Torque can be measured via the eddy current brake device without contact so that external interfering influences can be minimized.

It is particularly advantageous if the eddy current brake device includes a first apparatus which can be firmly fixed to the rotor of a test electric motor and a spaced second apparatus (set apart second apparatus) and connected to the torque sensor. Here, the second apparatus, for example, can generate magnetic fields and on rotation of the first apparatus in the magnetic field of the second apparatus, eddy currents are induced in the first apparatus. This situation could also be reversed. The eddy currents in turn result in the rotor being braked and the corresponding counter moment can be measured via the torque sensor. The first apparatus is formed in such a way that sufficiently large eddy currents can be induced in it in order to thus achieve a sufficiently strong braking effect. To a certain extent, the first apparatus thus forms a kind of "brake disk".

If the surface of the first apparatus and that of the second apparatus which face each other are formed to be essentially even, a strong, defined braking effect can be achieved enabling the torque of the electric motor to be measured as a function of rotational speed in a simple and precise manner.

In this context, it is favorable if the side of the first apparatus that faces the second apparatus has a circular cross-section. The second apparatus can correspondingly have a circular cross-section on the side facing the first apparatus. An optimal braking function can be achieved in this way.

It is moreover favorable if the first apparatus and the second apparatus are arranged coaxially and particularly coaxial to a rotational axis of the motor. This goes to minimize a related axial offset and the torque of the electric motor can be determined with high precision.

For the same reason, it is favorable if the torque sensor and the second apparatus are arranged coaxially.

It is favorable if the eddy current brake device has a magnetic field generating apparatus and a corresponding apparatus made of an electrically conductive material in which eddy currents can be induced. One of these apparatuses rotates with the rotor. Eddy currents are then induced which result in the rotor being braked, the corresponding counterforce affecting the other apparatus in turn. This counterforce can be measured as counter torque using the torque sensor.

It is particularly advantageous if the magnetic field generating apparatus is connected to the torque sensor. The magnetic field generating apparatus generally has a greater mass than the apparatus in which eddy currents are induced. The apparatus rotating with the rotor can then be made of a light metal such as aluminum since it is important to ensure sufficient electrical conductivity.

It is moreover favorable if the material in which the eddy currents are induced is non-magnetic. Copper or aluminum is preferably used.

It is basically possible for the magnetic field generating apparatus to include electromagnets. A particularly simple design is created if the magnetic field generating apparatus is provided with one or more permanent magnets. This makes it easy to generate a magnetic field, eddy currents being generated in the first apparatus by the rotation of the first apparatus in this magnetic field. The permanent magnet (s) are multi-pole magnets in particular. The permanent magnets preferably have a high residual magnetism (remanence); this produces high field magnitude and consequently a strong braking effect.

For the same reason, it is favorable if the magnetic field generating apparatus is made of a magnetically conductive material or comprises regions made of a magnetically conductive material. Iron regions, for example, are provided. This enables the field distribution to be specifically adjusted and the field lines to be bundled in such a way that a stronger field can be applied to the first apparatus which again leads to a greater braking effect.

Provision can be made for the magnetic field generating apparatus to be formed from several disks, i.e. comprising a plurality of disks which are provided with one or more magnets. The disks can have different diameters. This enables the field distribution to be specifically adjusted.

If the first apparatus is provided with a chuck, it can be easily fixed to the rotor so that it can rotate with the rotor. The chuck can be used, for example, to fix the first apparatus to the rotor hub. In particular, the aperture width of the chuck should be adjustable so that the respective first apparatus can be used for a variety of motor types.

It is favorable if a rotational speed sensor is provided to record the number of revolutions of the rotor in order to thus obtain a direct reading for the rotational speed. This means that the torque can in turn be reproducibly determined as a function of rotational speed.

It is also favorable if a rotational position sensor to record the angular position of the rotor is provided so that the angular position of the rotor is also known during measurement. It is basically possible to integrate a speed sensor and an angular sensor by providing a code disk with corresponding coding and one or more sensors to read this code. Suitable coding makes it possible to determine the speed information (i.e. the number of revolutions) and the location information (i.e. the angular position).

The rotational speed and/or angular position can be easily determined if the first apparatus is provided with rotational speed coding and/or angular position coding. In particular, this means that additional code disks need not be provided which in turn means that air friction for the first apparatus is minimized.

It is also basically possible for a code disk to be arranged on the first apparatus as a transducer by means of which, the rotational speed and/or the angular position can be measured. The torque sensor is arranged fixedly with respect to the holding apparatus and held stationary in particular. This allows the torque of the electric motor to be determined by means of the measured torque.

It is favorable if the distance between the first apparatus and the second apparatus can be adjusted. This enables the magnetic field applied to the first apparatus to be adjusted. The magnetic field is particularly increased when the second apparatus is brought closer to the first apparatus. This in turn makes it possible to adjust the braking effect. Assuming a defined rotational speed, this can be used, for example, to brake the rotor more strongly and thus to determine the torque necessary for such braking.

Further, in accordance with the invention, a method to measure the torque of an electric motor having a rotor and a stator in that the stator is held non-rotatably is provided, in which the rotor is set in rotation through the motor in operation, the rotor is braked using an eddy current brake device and the resulting torque is measured on the eddy current brake device.

Provision can thereby be made for the rotor to be first set in rotation, particularly at a defined rotational speed, and braking action to then be taken, or for a braking force to be applied while the motor is still running up.

The method according to the invention can be carried out using the torque measuring device according to the invention. The method has the same advantages as explained above in relation to the measuring device.

Other beneficial embodiments have also been explained in connection with the measuring device according to the invention.

In accordance with the invention, provision has been made in particular for the number of revolutions of the rotor to be measured in order to obtain a defined measured value for the rotational speed.

Provision can be made for the position of the rotor to be measured in addition or as an alternative.

To measure the torque, the rotor running at a defined rotational speed is braked. For this purpose, the rotor is rotated at the defined rotational speed and driven by an electric motor that, in particular, is not controlled. By reducing the distance between a magnetic field generating apparatus and an apparatus in which eddy currents are induced, the braking effect that is exerted on the driven rotor is increased.

Depending on the distance, the rotor is braked down to a defined rotational speed (not equaling zero). In this context, it is also possible to let the rotor rotate at a specific rotational speed with the motor being in uncontrolled operation, there being at the same time the braking effect of the eddy current brake device. In this way, the torque can be determined as a function of rotational speed. The defined rotational speed is thereby determined through an initial speed (the speed that would occur if there were no braking effect) and the magnitude of the braking effect.

The magnitude of the braking effect can particularly be adjusted in that the distance between a magnetic field generating apparatus of the eddy current brake device and a corresponding apparatus in which eddy currents are induced is adjusted. One aim of this adjustment could be to achieve an optimized braking effect.

In particular, the apparatus in which eddy currents are induced is preferably connected fixedly to the rotor. This apparatus can be made of a light metal such as aluminum since it is not made of a magnetically conductive material in particular.

It is favorable if the field magnitude and/or field distribution for a magnetic field generating apparatus of the eddy current brake device is adjusted with respect to the apparatus in which eddy currents are induced. This enables a desired braking effect to be achieved. It is basically possible to change the field magnitude and the field distribution by moving the magnetic field generating apparatus towards the first apparatus. This results in an increase in the field magnitude at the first apparatus. However, it is also possible for the generation of the magnetic field at the magnetic field generating apparatus to be itself controlled by providing, for example, controllable electromagnets. The adjustment methods using the distance apart and the direct magnetic field control can also be combined with each other.

It is favorable if in addition to the torque, other motor parameters such as motor current or total current, comprising a motor current and a current at a motor control circuit, are measured.

It is possible to determine the torque of the electric motor as a function of rotational speed with great precision if the measured torque is corrected for the air friction portion of an apparatus rotating with the rotor. The rotor has to drive this apparatus as well. Due to air friction, a certain (extrinsic) torque is necessary for this purpose. Appropriate correction can be made by subtracting the relevant air friction moment.

In particular, the air friction moment of the apparatus rotating with the rotor is ascertained as a function of rotational speed and the results are stored in a database. This provides a kind of calibration function so that during the actual measurement of a test electric motor, the related air friction moments can be subtracted in order to obtain a precise value for the torque of the electric motor as a function of rotational speed.

The following description of a preferred embodiment in conjunction with the drawing serves to explain the invention in more detail.

BRIEF DESCRIPTION OF THE DRAWINGS

As the only FIGURE.

DETAILED DESCRIPTION OF THE INVENTION

Figure 1:
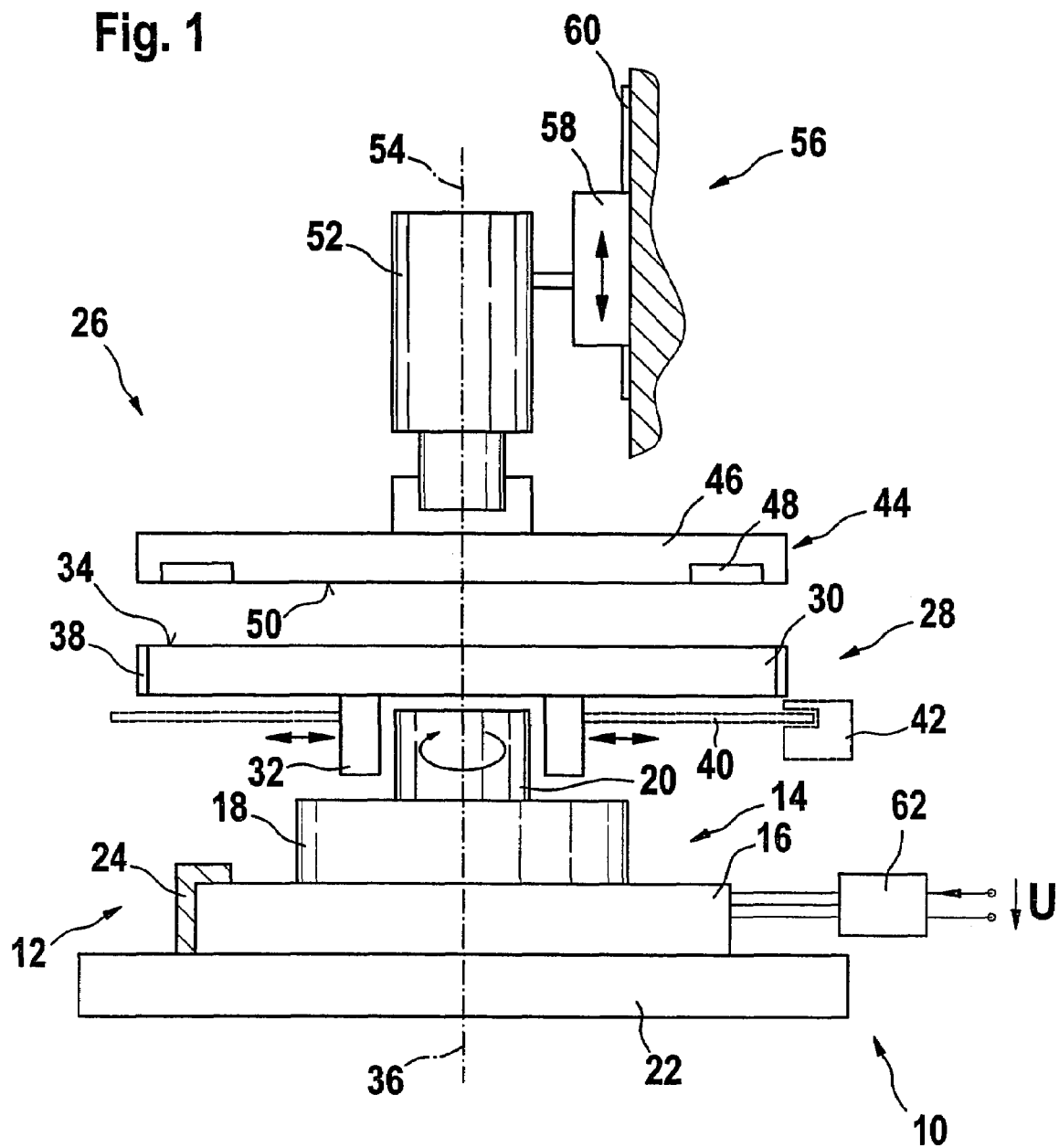
FIG. 1 shows a schematic view from the side of an embodiment of a torque measuring device according to the invention.

An embodiment of a torque measuring device according to the invention as shown in FIG. 1 and indicated there in its entirety by 10, comprises a holding apparatus (holding device) 12 to hold an electric motor 14 functioning as a test motor. The electric motor 14 comprises a stator 16 and a rotor 18 that can rotate with respect to the stator 16. In the embodiment illustrated in FIG. 1, the rotor 18 has a rotor hub 20.

The holding apparatus 12 is used to hold the stator 16 non-rotatably. It comprises, for example, a holding plate 22 to which the stator 16 is firmly fixed using such fasteners as holding brackets 24 or suchlike.

Provision can be made for the holding plate 22 to be air journalled to support the electric motor 14 with as little vibration as possible.

In accordance with the invention, an eddy current brake device indicated in its entirety by 26 is provided. This comprises a disk-shaped element 30 as a first apparatus (first device) 28 made of an electrically conductive material, such as aluminum so that eddy currents can be induced in this disk-shaped element 30. At the same time, the disk-shaped element 30 is made of a magnetically non-conductive material (non-magnetic material).

The disk-shaped element 30 can be firmly fixed to the rotor 18 using, for example, a chuck 32 which can encompass the rotor hub 20 and clamp onto the rotor hub 20. The aperture width of the chuck 32 is preferably adjustable.

The disk-shaped element 30 preferably has a circular cross-section and an even surface 34.

The disk-shaped element 30 is formed symmetric to a central axis. The disk-shaped element 30 is set on the rotor 18 in such a way that this central axis lies coaxial to a rotor axis 36. This rotor axis 36 is the rotational axis of the electric motor 14.

The first apparatus 28 is connected fixedly to the rotor 18 and the rotor 18 is set in rotation by the motor in operation. The rotational speed of the rotor 18 is measured using a rotational speed sensor. The rotational speed sensor can be an encoder which includes, for example, an optical sensor. The disk-shaped element 30 is formed, for example, as a code disk which carries code symbols 38 on or near its circumference edge. The rotational speed can be determined by such code symbols 38 moving past the encoder. With an appropriate design of the code symbols, it is also possible to determine the angular position of the first apparatus 28 if a plurality of optical sensors have been provided accordingly or an optical sensor is provided that can monitor an angular range.

As an alternative or an addition, the first apparatus 28 can include a separate code disk 40 which is arranged fixedly with respect to the disk-shaped element 30 and rotates with the rotor 18. The code disk 40 carries code symbols which are moved past one or more corresponding speed sensors 42 when the rotor 18 rotates. The rotational speed of the rotor 18 and its angular position, where applicable, can then in turn be determined from this.

The eddy current brake device 26 moreover includes a second apparatus (second device) 44 arranged opposite the first apparatus 28, the second apparatus 44 being formed as a magnetic field generating apparatus. This second apparatus 44 is arranged coaxial to the rotor axis 36. It includes one or more disk elements 46 made of a magnetically conductive material such as iron or at least has regions made of such a material. The disk element 46 is provided with magnets 48 which can basically be electromagnets or permanent magnets. A plurality of multi-pole permanent magnets are preferably provided.

The disk element 46 has an essentially even surface 50 that faces the disk-shaped element 30. When torque is being measured, the disk element 46 and the disk-shaped element 30 are positioned apart from each other with the surfaces 34 and 50 being essentially parallel to each other.

The second apparatus 44 can basically include a plurality of disk elements 46 which are fitted with magnets 48. It is also possible for the disk elements to have different diameters.

The disk element 46 preferably has a circular cross-section at least on its surface 50.

Provision can be made for the diameter of at least the surface 50 of the disk element 46 to essentially correspond to the diameter of the surface 34 of the disk-shaped element 30.

A torque sensor 52 is coupled to the disk element 46, the torque sensor 52 being held stationary with respect to the holding plate 22. With one axis 54, the torque sensor 52 is arranged coaxial to the disk element 46. The disk element 46 in turn is positioned coaxial to the rotor axis 36 with its symmetric axis.

A holding apparatus (holding device) 56 is provided to hold the torque sensor 52 and thus the second apparatus 44. It is thereby basically possible for the torque sensor 52 to be held at the holding apparatus 56 so that it can be moved and secured in one direction along its axis 54, making it possible to adjust the distance between the disk-shaped element 30 and the disk element 46. For this purpose, the holding apparatus 56 can include, for example, one or more guide shoes 58 that can be moved and secured along a guide 60.

A motor control circuit 62 is provided to control the electric motor 14. Using an appropriate measuring apparatus, the motor current can be measured with the motor in operation as well as the total current comprising the motor current and a current arising from the motor control circuit 62. Moreover, the voltage U which is applied to the motor control circuit 62 can be measured.

Provision can also be made for the motor voltage phases to be measured.

The method according to the invention to measure the torque of the electric motor 14 as a function of the rotational speed of the rotor 18 is based on the principle of the eddy current brake:

When the rotor 18 rotates, the disk-shaped element 30 rotates with it at the same rotational speed. The rotational speed is determined using the speed sensor 42. When the disk-shaped element 30 moves in the magnetic field of the second apparatus 44, induction currents 44 are induced in the disk-shaped element 30. These induction currents 44 act against their cause, namely the rotation of the disk-shaped element 30 in the magnetic field, and thus brake the rotor 18. A corresponding counterforce is exerted on the disk element 46 which produces torque. This torque can be measured using the torque sensor 52. The measured torque is a measure of the torque of the electric motor 14.

Various methods of measuring torque can be applied, the electric motor always being in operation, i.e. the rotor movement before braking is proper motion.

By way of example, the second apparatus 44 is moved so far away from the first apparatus 28 that this apparatus 44 does not have any influence on the first apparatus 28, i.e. a braking effect is not produced. The electric motor 14 is then operated at a specific rotational speed which is measured, for example, using the speed sensor 42 or the speed sensor to which the code symbols 38 are allocated. The second apparatus 44 is then moved towards the first apparatus 28 in that the combination of torque sensor 52 and second apparatus 44 is moved along the guide 60 towards the electric motor 14. This goes to intensify the magnetic field in which the disk-shaped element 30 rotates. The corresponding torque is measured using the torque sensor 52 (the motor operating parameters are not changed externally during this braking process). The measured torque then indicates the torque of the electric motor 14 as a function of initial speed and the distance between the first apparatus 28 and the second apparatus 44.

If the second apparatus 44 is not provided with permanent magnets but rather with electromagnets whose field magnitude can be controlled, it is basically possible to keep the distance between the second apparatus 44 and the first apparatus 28 constant, increasing, however, the magnetic field over time in order to vary the braking moment. (The magnetic field is increased by increasing the current flow through the electromagnets.)

At a fixed distance between the second apparatus 44 and the first apparatus 28, it is also possible to measure the torque for a specific rotational speed of the electric motor 14 using the torque sensor 52. The rotational speed then results as a function of an initial speed (rotational speed when no braking effect arises) and the application of the magnetic field on the first apparatus 28.

In the possibilities described above of implementing the method according to the invention, torque can be measured as a function of the rotational speed of the rotor 18 with respect to the stator 16.

A specific portion of the torque measured by the torque sensor 52 can be attributed to the fact that the rotor has also to move the disk-shaped element 30 with the code disk 40, where applicable, and thus overcome air friction. Thus the portion of torque attributed to air friction produced by the first apparatus 28 has basically to be subtracted.

This is why, in particular, the air friction of the first apparatus 28 is measured as a function of the rotational speed before the actual torque measurement for a test electric motor is made. The corresponding calibration data is stored.

For the actual measurement, the portion accounted for by air friction is subtracted from the torque determined by the torque sensor 52 for a specific rotational speed in order to obtain the "pure" torque of the test electric motor 14 as a function of rotational speed.

At the same time the torque is measured, the motor current, the total current, the applied voltage U and the voltage phase are determined.

Identification Reference List
10 Torque measuring device
12 Holding apparatus
14 Electric motor
16 Stator
18 Rotor
20 Rotor hub
22 Holding plate
24 Holding bracket
26 Eddy current brake device
28 First apparatus
30 Disk-shaped element
32 Chuck
34 Surface
36 Rotor axis
38 Code symbols
40 Code disk
42 Rotational speed sensor
44 Second apparatus
46 Disk element
48 Magnet
50 Surface
52 Torque sensor
54 Axis
56 Holding apparatus
58 Guide shoe
60 Guide
62 Motor control circuit

The invention claimed is:

1. A torque measuring device for electric motors having a rotor and a stator, comprising:
   a holding apparatus to hold the stator of the electric motor non-rotatably;
   an eddy current brake device via which the rotor of the electric motor is brakeable;
   a torque sensor connected to the eddy current brake device; and
   a position sensor for determining an angular position of the rotor of the electric motor.

2. A torque measuring device according to claim 1, wherein the eddy current brake device comprises a first apparatus which is fixable to the rotor and a spaced second apparatus connected to the torque sensor.

3. A torque measuring device according to claim 2, wherein surfaces of the first apparatus and the second apparatus which face each other are formed to be essentially even.

4. A torque measuring device according to claim 2, wherein a side of the first apparatus that faces the second apparatus has a circular cross-section.

5. A torque measuring device according to claim 2, wherein a side of the second apparatus that faces the first apparatus has a circular cross-section.

6. A torque measuring device according to claim 2, wherein the first apparatus and the second apparatus are arranged coaxially.

7. A torque measuring device according to claim 2, wherein the torque sensor and the second apparatus are arranged coaxially.

8. A torque measuring device according to claim 1, wherein the eddy current brake device comprises a magnetic field generating apparatus and a corresponding apparatus made of an electrically conductive material in which eddy currents can be induced.

9. A torque measuring device according to claim 8, wherein the material for the corresponding apparatus is non-magnetic.

10. A torque measuring device according to claim 8, wherein the magnetic field generating apparatus is connected to the torque sensor.

11. A torque measuring device according to claim 8, wherein the magnetic field generating apparatus is provided with one or more permanent magnets.

12. A torque measuring device according to claim 8, wherein the magnetic field generating apparatus is made of a magnetically conductive material or comprises regions made of a magnetically conductive material.

13. A torque measuring device according to claim 8, wherein the magnetic field generating apparatus is formed from several disks.

14. A torque measuring device according to claim 2, wherein the first apparatus is provided with a chuck for fixing said first apparatus to the rotor.

15. A torque measuring device according to claim 1, wherein a rotational speed sensor is provided to determine rotational speed of the rotor.

16. A torque measuring device according to claim 2, wherein a distance between the first apparatus and the second apparatus is adjustable.

17. A torque measuring device according to claim 2, wherein the first apparatus is provided with at least one of a rotational speed coding or an angular position coding.

18. A torque measuring device according to claim 2, wherein a code disk is arranged on the first apparatus.

19. A torque measuring device according to claim 1, wherein the torque sensor is arranged fixedly with respect to the holding apparatus.

20. A torque measuring device for electric motors having a rotor and a stator, comprising:
- a holding apparatus to hold the stator of the electric motor non-rotatably;
- a torque sensor; and
- an eddy current brake device via which the rotor of the electric motor is brakeable, said eddy current brake device comprising a first apparatus which is fixable to the rotor and a spaced second apparatus connected to the torque sensor;
- wherein the first apparatus is provided with at least one of a rotational speed coding or an angular position coding.

21. A torque measuring device according to claim 20, wherein a position sensor is provided to determine an angular position of the rotor.

22. A torque measuring device for electric motors having a rotor and a stator, comprising:
- a holding apparatus to hold the stator of the electric motor non-rotatably;
- a torque sensor; and
- an eddy current brake device via which the rotor of the electric motor is brakeable, said eddy current brake device comprising a first apparatus which is fixable to the rotor and a spaced second apparatus connected to the torque sensor;
- wherein a code disk is arranged on the first apparatus.

23. A torque measuring device for electric motors having a rotor and a stator, comprising:
- a holding apparatus to hold the stator of the electric motor non-rotatably;
- a torque sensor; and
- an eddy current brake device via which the rotor of the electric motor is brakeable, said eddy current brake device comprising a first apparatus which is fixable to the rotor and a spaced second apparatus connected to the torque sensor;
- wherein a distance between the first apparatus and the second apparatus is adjustable.

* * * * *